United States Patent [19]
Berger

[11] 3,815,009
[45] June 4, 1974

[54] POWER INVERTER CIRCUIT

[75] Inventor: James K. Berger, Sherman Oaks, Calif.

[73] Assignee: Pioneer Magnetics, Inc., Santa Monica, Calif.

[22] Filed: June 11, 1973

[21] Appl. No.: 368,605

[52] U.S. Cl. .............................. 321/45 R, 307/66
[51] Int. Cl. ............................................. H02m 3/14
[58] Field of Search............ 307/66; 321/45 R, 45 C

[56] References Cited
UNITED STATES PATENTS

| | | | |
|---|---|---|---|
| 3,175,167 | 3/1965 | Lloyd | 321/45 R |
| 3,355,654 | 11/1967 | Risberg | 321/45 R X |
| 3,496,092 | 2/1970 | Fraser | 321/45 R X |
| 3,518,526 | 6/1970 | Genvit | 321/45 R X |
| 3,573,597 | 4/1971 | Genvit et al. | 321/45 R |

Primary Examiner—William M. Shoop, Jr.
Attorney, Agent, or Firm—Jessup & Beecher

[57] ABSTRACT

A high-frequency power inverter circuit is provided which responds to a first direct-current voltage to provide an alternating-current voltage which may be rectified to provide a second direct-current voltage of different value than the first direct-current voltage. The first direct-current voltage is obtained by rectifying the alternating-current voltage from the usual alternating-current mains. The high-frequency power inverter circuit of the invention is constructed to operate on the European standard 230–240 volt alternating-current voltages, and to be capable of being adapted by a simple connection to operate on the United States standard of 115–117 volts alternating-current voltage. This is achieved by providing two sections in the power inverter circuit which are effectively connected in series for the higher voltage input, and in shunt for the lower voltage input.

5 Claims, 5 Drawing Figures

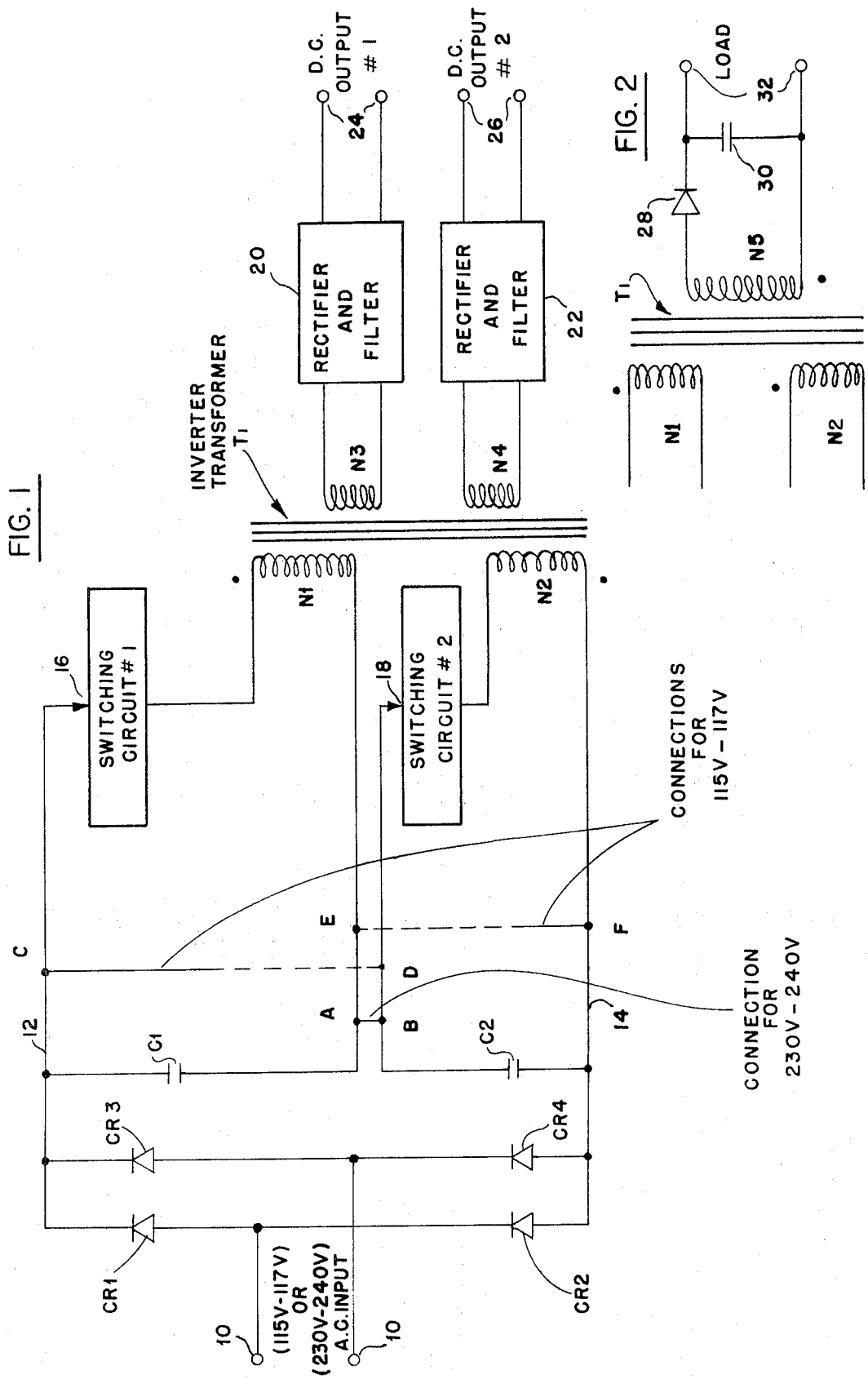

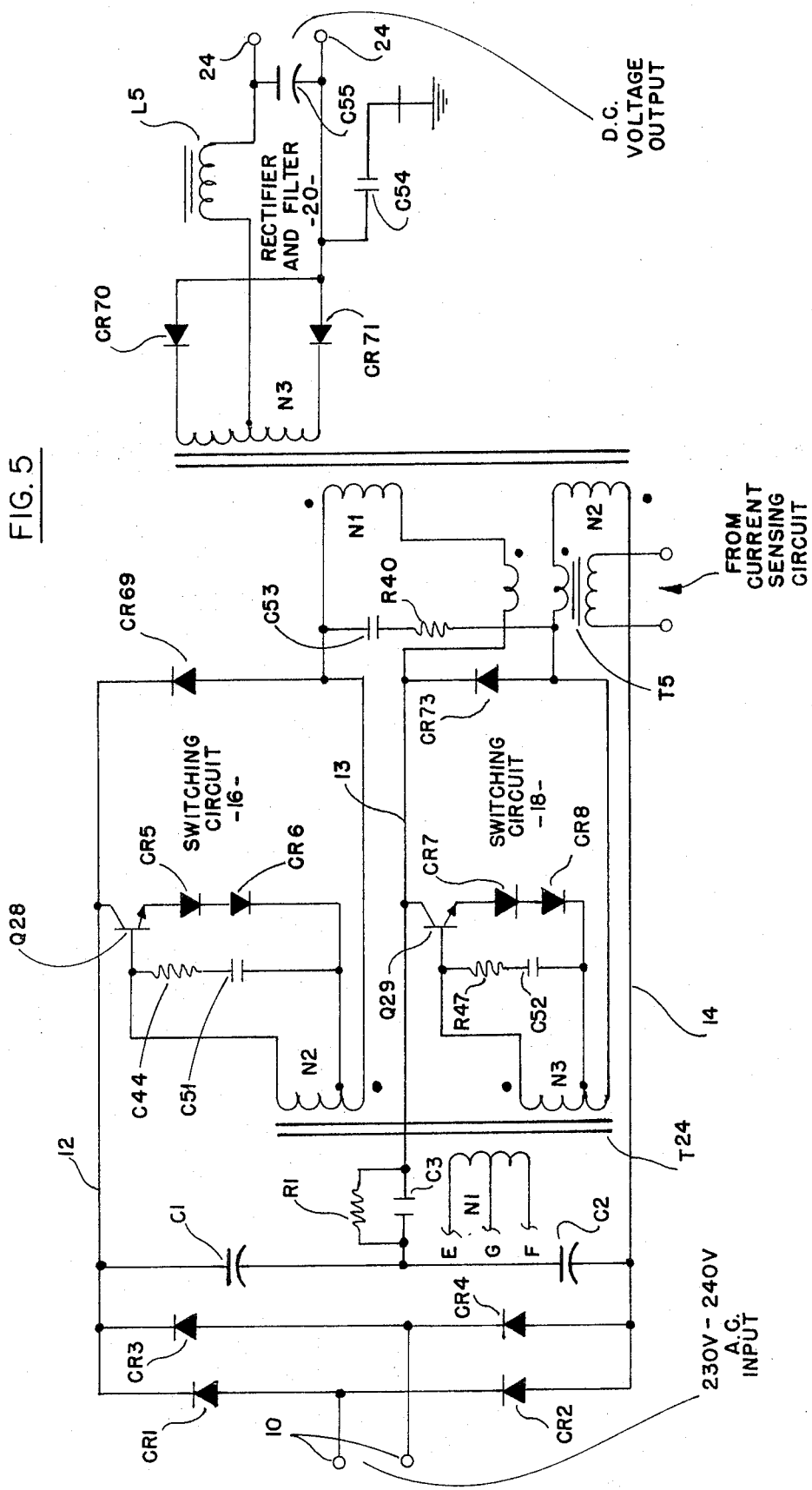

POWER INVERTER CIRCUIT

BACKGROUND OF THE INVENTION

High-frequency power inverters are known which operate from a direct-current voltage obtained by direct rectification of the alternating-current voltage derived from the usual alternating-current mains. Such power inverters are capable of producing one or more output voltages having values different from the voltage derived from the mains, and of achieving this more economically, and by lighter and more compact equipment than the usual direct-current power supplies using conventional power transformers. Frequently it is desired to operate such high-frequency power inverters from either the usual European 230-240 volt alternating-current mains, or the United States 115-117 volt alternating-current mains.

High frequency power inverters which are capable of operating at the two different alternating-current voltage input levels are known. For example, prior art power inverters are available which are equipped with voltage doubling circuits that are activated when the alternating current input voltage is of the order of 115-volts, and which are de-activated when the alternating-current input voltage is of the order of 230-volts. Such inverters are designed to operate at the higher voltage level, with the voltage doubling circuit providing the required voltage when the alternating-current main voltage is at the lower level.

A disadvantage inherent in the prior art power inverter referred to in the preceding paragraph is that is is difficult and expensive to construct the equipment. Specifically, the voltage doubling type of prior art inverter must either be a full bridge network, or it must be equipped with transistors, or other switching devices, capable of withstanding impractically high voltage levels. Moreover, when the full bridge type of circuit is used, an excessive number of transistors are required, and the transistors must be operated in a manner which makes adequate heat sinking impractical.

The improved power inverter of the present invention is not subject to the disadvantages inherent in the voltage doubler type of system. The inverter of the invention may be connected to operate on either of the two alternating-current input voltage levels without requiring its circuit elements to withstand impractically high voltages. In addition, the power inverter of the invention does not require an excessive number of transistors. Also, the transistors in the power inverter of the invention are connected in a manner to render heat sinking practical.

BRIEF DESCRIPTION OF THE DRAWINGS

FIG. 1 is a diagram, partly in block form and partly in circuit detail, showing one embodiment of the power inverter circuit of the invention;

FIG. 2 is a fragmentary diagram showing a modification to the output circuit of the system of FIG. 1, and illustrating the manner in which the invention may be applied to single-ended flyback converters;

FIG. 5 is a circuit diagram of a constructed embodiment of the invention.

DETAILED DESCRIPTION OF THE ILLUSTRATED EMBODIMENTS

Figure 4:
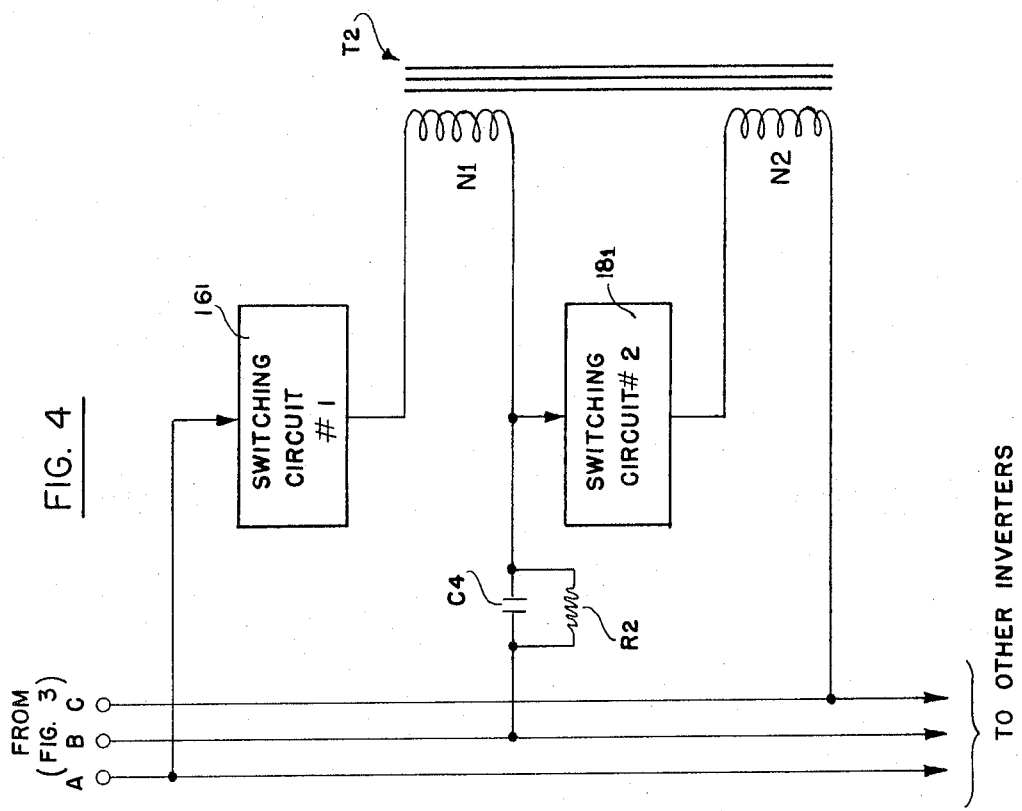
FIG. 4 is a fragmentary circuit which may be connected to the circuit of FIG. 3, and illustrating the manner in which the system of the invention may have a common portion and a plurality of independent portions each operating independently of the other.

The power rectifier system of FIG. 1 includes a pair of input terminals 10 which may be connected to the appropriate alternating-current mains. As stated above, for one connection of the power inverter system, the alternating-current input voltage may be in the range of 115-117 volts, and for a second connection of the system, the alternating-current input voltage may be in the range of 230-240 volts. One of the input terminals 10 is connected to the anode of a diode CR1 and to the cathode of a diode CR2, and the other input terminal 10 is connected to the anode of a diode CR3 and to the cathode of a diode CR4. The diodes operate as full-wave rectifiers so that a rectified voltage appears between the leads 12 and 14.

A capacitor C1 is connected to the lead 12, and a capacitor C2 is connected to the lead 14. The lead 12 is also connected to a switching circuit 16, and the capacitor C2 is connected to a switching circuit 18. The switching circuit 16 is designated as No. 1, and the switching circuit 18 is designated as No. 2.

The switching circuit 16 is connected to a first winding N1 of a transformer T1, the other side of the winding N1 being connected to the capacitor C1. The switching circuit 18 is connected to a second winding N2 of the transformer T1, the other side of the winding N2 being connected to the lead 14. The transformer T1 has any desired number of secondary windings (such as N3 and N4) which are connected through respective rectifier and filter networks, such as represented by the blocks 20 and 22 to provide separate direct current output voltages at output terminals such as the output terminals 24 and 26.

When the system of FIG. 1 is to be operated with an alternating-current voltage input level of the order of 230-240 volts, the point A is connected to the point B, so that the capacitors C1 and C2 are effectively connected in series across the leads 12 and 14. The resulting rectified voltage of the order of 320 volts appears across the leads 12 and 14, but the connection provides that the switching circuits 16 and 18 are effectively in series across the leads, so that they independently operate at 115-120 volts. The switching circuits 16 and 18 operate as follows: First switching circuit No. 1 is conductive, causing current to flow from the lead 12 through switching circuit 1, through winding N1, and then through capacitor C1 back to lead 12. Then switching circuit No. 1 becomes non-conductive and switching circuit No. 2 becomes conductive, causing current to flow from lead B-D through switching circuit No. 2, through winding N2, and through capacitor C2 back to lead B-D. Then switching circuit No. 2 becomes non-conductive and switching circuit No. 1 again becomes conductive, and the cycle repeats. Current through winding N2 is of the opposite polarity to current through winding N1, so that the flux in the transformers is effectively that due to an alternating-current, which, in turn, induces corresponding alternating voltages in the secondary windings N3 and N4, which are rectified by the networks 20 and 22 to appear in corresponding direct-current output voltages across the terminals 24 and 26.

It is an important and novel part of this invention that in the connection for 230–240 volts input, the two winding and switching circuit pairs are effectively in series insofar as the main power frequency is concerned, and the current through the bridge rectifiers CR1, CR2, CR3, CR4 passes effectively in series through the two filter capacitors C1 and C2, but the two windings N1 and N2 are not in series insofar as the currents from the switching circuits 16 and 18 are concerned; in fact the two windings conduct alternately, and are never conducting at the same instant. It is this feature which distinguishes this invention from prior art systems such as transformers with split primaries and motors with dual windings in which a connection is made in series for 230–240 volts and in parallel for 115–117 volts. In those prior art systems current was required to flow simultaneously in the two elements, and not alternately as in this invention.

For the 115-volt — 117-volt alternating-current voltage input, the connections, instead of being made between the points A and B, are made between the points C and D, and E and F. These latter connections effectively connect the switching circuits 16 and 18 in shunt across the leads 12 and 14. The rectified voltage across the leads 12 and 14 is now in the order of 115–120 volts, so that the normal operating voltage of the switching circuits 16 and 18 is provided.

The system of FIG. 1, therefore, may be connected to operate on either of the two alternating-current input voltage levels without requiring the circuit elements in the switching circuits 16 and 18 to operate at impractically high voltages. Also, the overall complexity of the system of FIG. 1 is reduced as compared with the voltage doubler type of power inverter discussed above. In the circuit of FIG. 1, the circuit elements, such as the transistors in the switching circuits 16 and 18 can have their collectors all connected to the direct-current voltage leads 12 or B-D, and therefore do not have high frequency alternating-current voltage applied to their collectors. Therefore, there is no significant capacitive effect between the casings of the transistors and the chassis or other structural members, so that the transistors can be mounted in insulated heat sinks without regard to high voltage high frequency consideration.

A further advantage of the system of FIG. 1, and as mentioned above, is that the switching circuits 16 and 18 at all times switch rectified voltages corresponding to the lower level alternating-current voltage levels, and not the higher alternating-current voltage levels, so that it is not necessary to use transistors, or other circuit elements in the switching circuits having excessively high breakdown voltages. A further advantage over the prior art voltage doubler type of system is that the switching circuits 16 and 18 require fewer circuit elements, and are less complex than the corresponding circuitry in the prior art system.

The system of FIG. 1 has yet a further advantage in the series connection in that it does not require close matching of the transistors or other circuit elements in the switching circuits 16 and 18, or of the transformer windings N1 and N2 or of the transformer windings N3 and N4 in order to prevent the system from accumulating an unbalance of volt-seconds applied to the transformer T1 with consequent saturation of the transformer core. The voltage at the common connection point of the capacitors C1 and C2 will tend to assume a value which will result in equal volt-seconds applied to the transformer windings N1 and N2 regardless of transistor saturating voltage or switching time differences, and regardless of differences in the transformer windings N1 and N2.

Figure 3:
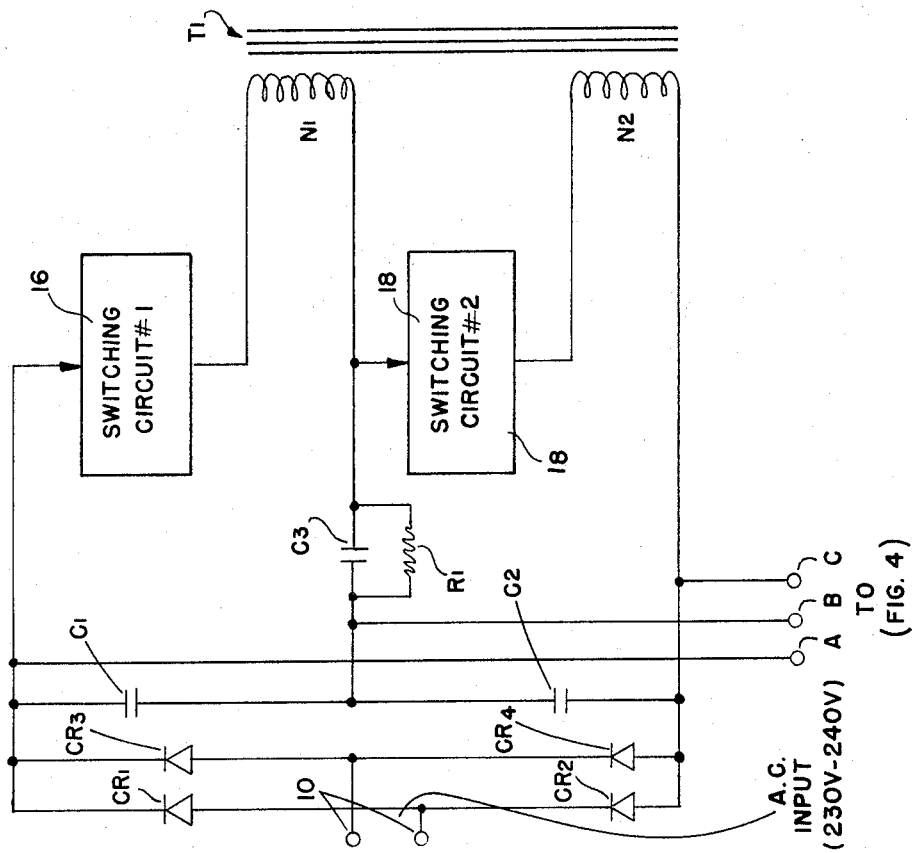
FIG. 3 is a fragmentary circuit, showing the manner in which the system of FIG. 1 may be modified to incorporate a self-balancing network.

The self-adjusting feature can be augmented by providing a small capacitor C3 between the common connection of the capacitors C1 and C2 and the common connection between the transformer winding N1 and switching circuit 18, as shown in FIG. 3. The capacitor C3 is shunted by a resistor R1, as shown. In the systems of FIGS. 1 and 3, the capacitors C1 and C2 operate as filter capacitors for the rectified input power, and they are large enough to provide adequate filtering at the 50 or 60 Hertz power frequency. Capacitor C3 in the circuit of FIG. 3, on the other hand, is a smaller capacitor which provides adequate filtering at the high frequency switching rate, for example, at 20 Kilohertz. The resistor R1 provides a direct-current path from the winding N1 back to the common junction of the capacitors C1 and C2 to assure that the capacitors C1 and C2 are charged to approximately equal voltages.

The use of the capacitor C3 in the circuit of FIG. 3 provides, therefore, a self-correcting feature which is fast acting due to the smaller capacity of the capacitor C3, so as to minimize any danger of damage to the circuit elements in the switching circuits 16 or 18 due to transformer saturation. The inclusion of the capacitor C3 also has a second advantage in that it enables more than one inverter circuit to be connected to the same input filter, as shown in the circuit of FIG. 4. FIG. 4 represents a second inverter circuit which may be connected through the terminals A, B and C to the circuit of FIG. 3. The inverter circuit of FIG. 4 includes its own switching circuits 16' and 18' and its own transformer T2. Also, it includes its own self-correcting network C4, R2 so that it is able to self-correct any unbalances in its circuit independently of the circuit of FIG. 3.

The fragmentary circuit of FIG. 2, as mentioned above, shows how the circuits of FIGS. 1, 3 or 4 may be modified to provide a similar operation in a single-ended flyback converter. In the circuit of FIG. 2, the polarity of the winding N2 is reversed. Also, the output takes the form of a usual power diode 28 and capacitor 30 connected across a secondary winding N5 of the transformer T1. The load is connected to the output terminal 32.

A constructed embodiment of the invention is shown in the circuit diagram of FIG. 5. In the circuit of FIG. 5, the input filter capacitors C1 and C2 each have a capacity of 3,000 microfarads, whereas the capacitor C3 has a capacity of 4 microfarads. The resistor R1 which shunts the capacitor C3 has a value of 1 kilo-ohm.

The switching circuit 16 includes an NPN transistor Q28 which may be of the type designated PP2042. The collector of the transistor Q28 is directly connected to the lead 12, and an appropriate heat sink may be mounted on the collector, as mentioned above. The emitter of the transistor Q28 is connected through a pair of diodes CR5 and CR6 to a tap on a secondary winding N2 of a transformer T24. The diodes CR5 and CR6 may each be of the type designated 1N4720. The base electrode of the transistor Q28 is connected to a 47 ohm resistor R44 which, in turn, is connected to a capacitor C51. The capacitor C51 may have a capacity of 0.0033 microfarads, and it is connected to the cathode of the diode CR6.

Likewise, the switching circuit 18 includes an NPN transistor Q29 which also may be of the type designated PP2042. The emitter of the transistor Q29 is connected to a diode CR7 which, in turn, is connected to a diode CR8, the latter diode being connected to a tap on a winding N3 of the transformer T24. A resistor R47 is connected to the base of the transistor Q29, and a capacitor C52 connects the resistor to the junction of the diode CR8 and the tap of the winding N3. The resistor R47 may have a resistance of 47 ohms, and the capacitor C52 may have a capacity of 0.0033 microfarads. Each of the diodes CR7 and CR8 may be of the type designated 1N4720. The transformer T24 applies appropriate control signals to the switching circuits 16 and 18 in a manner known to the art, and it responds to a control signal applied to its primary winding N1.

The lead 12 is connected to the winding N1 of the transformer T1 through a diode CR69 which may be of the type designated S6M. Likewise, the lead 13 from the switching circuit 18 is connected to the winding N2 of the transformer T1 through a diode CR73 which also may be of the type designated S6M. The secondary winding of a transformer T5 also has a third winding interposed in the circuit to the winding N1 of the transformer T1. One side of the winding N1 is connected to a capacitor C53 which, in turn, is connected through a resistor R40 to one side of the winding N2. The capacitor C53 may have a capacity of 0.001 microfarads, and the resistor R40 may have a resistance of 200 ohms.

The circuitry of the rectifier and filter 20 is shown in FIG. 5. The circuit includes a pair of diodes CR70 and CR71 which are connected to the sides of the secondary winding N3 of the transformer T1. The anodes of the diodes are connected together and to a filter capacitor C54. The center tap of the winding N3 is connected through a choke coil L5 to one of the output terminals 24. The other output terminal 24 is connected to the anodes of the diodes CR70 and CR71. The capacitor C54 may have a capacity of the order of 0.47 microfarads.

In the circuit of FIG. 5, the diodes CR5, CR6, CR7 and CR8 are bias diodes which are used to provide a voltage drop to assist in the turn-off of the switching transistors Q27 and Q29. The diodes CR69 and CR73 are used to protect the transistors Q28 and Q29 from harmful reverse voltage spikes which can occur due to the leakage reactance of the transformer T1. The resistor R47 and capacitor C52, and the resistor R44 and capacitor C51 prevent undesired ringing of the transformer T24. The resistor R40 and capacitor C53 provides a load line compensation network which serves to delay the application of voltage to the transistors Q28 and Q29 until the current has decayed sufficiently to minimize switching losses.

In the output circuit, the diodes CR70 and CR71 are the output rectifier diodes, whereas the choke coil L5 and capacitor C55 form the output filter. The capacitor C54 is a noise suppression capacitor. The Transformer T5 is for current sensing purposes, and is used in the control function in a manner known to the art.

As described above, the system of the invention has the advantage in that it may be easily connected to operate either with the high level alternating-current input, or with the low level alternating-current input. Also, the concepts of the invention can be applied not only to power inverter systems, such as shown in FIG. 1, but also to single-ended flyback converters, such as shown in FIG. 2.

As illustrated in FIGS. 3 and 4, a plurality of inverters may be energized from a single rectifier, and this concept also applies to a multiplicity of flyback converters, or to a combination of inverters and converters, all driven from a comcom rectifier circuit.

The invention provides, therefore, an improved high frequency inverter system which is suitable for use with a relatively high input alternating-current voltage, and which may be easily connected to be appropriate for use in conjunction with a relatively low level alternating-current input voltage. The circuit is constructed so that when operating in the high input voltage mode, the transistors and other circuit elements of the switching circuits are not subjected to excessively high voltages.

Also, as noted above, the construction is such that the transistors in the switching circuits may be mounted in appropriate heat sinks without producing excessive extraneous capacitive effects, since the collectors of the transistors are connected to direct-current voltage, rather than high frequency alternating-current voltage, leads.

While a particular embodiment of the invention has been described, modifications may be made. It is intended in the claims to cover the modifications which fall within the spirit and scope of the invention.

What is claimed is:

1. A power inverter system, or the like, including: a pair of input terminals to be selectively connected to a high-voltage alternating current source and to a low-voltage alternating current source; a rectifier circuit connected to said input terminals; a first capacitor connected to one side of said rectifier circuit; a second capacitor connected to the other side of said rectifier circuit; a first switching circuit connected to said first capacitor; a second switching circuit connected to said second capacitor; a transformer having a first primary winding connected in series with said first capacitor and said first switching circuit, having a second primary winding connected in series with said second switching circuit and said second capacitor, and having at least one secondary winding; rectifier circuit means connected across said secondary winding and having a pair of output terminals across which a direct current output voltage appears; control circuitry connected to the first and second switching circuits for actuating the switching circuits in sequence to cause current to flow alternately in the first and second parimary windings of the transformer; a first connection for interconnecting said first capacitor and said second capacitor in series across said rectifier circuit for operation with said high-voltage alternating current source; and a second connection for interconnecting said first capacitor and said second capacitor in shunt across said rectifier circuit for operation with the low-voltage alternating current source.

2. The power inverter system defined in claim 1, in which said first and second switching circuits include transistors for performing their switching functions.

3. The power inverter system defined in claim 2, and which includes a further capacitor interposed in the series circuit of said second switching circuit, and a resistor shunting said further capacitor to provide a self-balancing control network for the switching circuits.

4. The power inverter system defined in claim 3, and which includes a second transformer having first and second primary windings; a third switching circuit; a fourth switching circuit; circuit means connecting said third switching circuit and said first primary winding of said second transformer across said first capacitor; and further circuit means connecting said fourth switching circuit and said second primary winding of said second transformer across said second capacitor.

5. The power inverter system defined in claim 4, and which includes a balancing capacitor connected in series with said second switching circuit, and a resistor shunting said balancing capacitor.

* * * * *